(12) United States Patent
Agostinelli et al.

(10) Patent No.: US 9,805,668 B2
(45) Date of Patent: Oct. 31, 2017

(54) DISPLAY SYSTEMS

(71) Applicant: Flexenable Limited, Cambridge, Cambridgeshire (GB)

(72) Inventors: Tiziano Agostinelli, Cambridge (GB); Jeremy Hills, St Neots (GB); David Gammie, Cambridge (GB); Stephan Riedel, Dresden (GB); Boon Hean Pui, Cambridge (GB)

(73) Assignee: FLEXENABLE LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 14/412,988

(22) PCT Filed: Jul. 8, 2013

(86) PCT No.: PCT/GB2013/051794
§ 371 (c)(1),
(2) Date: Jan. 5, 2015

(87) PCT Pub. No.: WO2014/013223
PCT Pub. Date: Jan. 23, 2014

(65) Prior Publication Data
US 2015/0161946 A1 Jun. 11, 2015

(30) Foreign Application Priority Data
Jul. 20, 2012 (GB) .................. 1212963.1

(51) Int. Cl.
*G09G 3/34* (2006.01)
*G02F 1/1362* (2006.01)
*G02F 1/1333* (2006.01)

(52) U.S. Cl.
CPC ....... *G09G 3/344* (2013.01); *G02F 1/136213* (2013.01); *G02F 2001/133397* (2013.01);
(Continued)

(58) Field of Classification Search
CPC ..... G09G 2320/0257; G09G 2330/021; G09G 3/3655; G09G 2330/027; G09G 2310/063;
(Continued)

(56) References Cited

U.S. PATENT DOCUMENTS 5,793,346 A * 8/1998 Moon .................. G09G 3/3648
345/211
6,054,974 A 4/2000 Sakai et al.
(Continued)

FOREIGN PATENT DOCUMENTS

EP 1701329 A1 9/2006
GB 2490035 A 10/2012
(Continued)

OTHER PUBLICATIONS

International Preliminary Report on Patentability dated Jan. 20, 2015 for International Application No. PCT/GB2013/051794.
(Continued)

*Primary Examiner* — Sanjiv D Patel
(74) *Attorney, Agent, or Firm* — Knobbe Martens Olson & Bear LLP (57) ABSTRACT

We describe a method of reducing artefacts in an image displayed by an active matrix electro-optic display and display driver, the electro-optic display driver comprising a plurality of active matrix pixel drivers each driving a respective pixel of the electro-optic display, each active matrix pixel driver having an associated storage capacitor coupled to a common backplane connection of the display driver, pixels of the electro-optic display having a common pixel electrode, the method comprising: driving the electro-optic display with a null frame during a power-down procedure of the display.

10 Claims, 8 Drawing Sheets

(52) U.S. Cl.
CPC ......... *G09G 2300/043* (2013.01); *G09G 2300/0473* (2013.01); *G09G 2300/0809* (2013.01); *G09G 2300/0842* (2013.01); *G09G 2300/0852* (2013.01); *G09G 2300/0876* (2013.01); *G09G 2310/0245* (2013.01); *G09G 2310/063* (2013.01); *G09G 2320/0257* (2013.01); *G09G 2320/046* (2013.01); *G09G 2330/026* (2013.01); *G09G 2330/027* (2013.01)

(58) Field of Classification Search
CPC ......... G09G 2310/0245; G09G 3/3648; G09G 2330/026; G09G 3/344; G09G 2380/14; G09G 3/044; G02F 1/136213; G02F 2001/133397; G06F 3/0416; G06F 3/044; G06F 7/60

See application file for complete search history.

(56) References Cited

U.S. PATENT DOCUMENTS

| | | | |
|---|---|---|---|
| 2003/0189564 A1* | 10/2003 | Lee | G09G 3/3648 345/212 |
| 2004/0196278 A1* | 10/2004 | Kida | G09G 3/3648 345/211 |
| 2007/0080919 A1* | 4/2007 | Wang | G09G 3/3648 345/94 |
| 2008/0042954 A1* | 2/2008 | Lee | G09G 3/3406 345/89 |
| 2008/0165099 A1* | 7/2008 | Cho | G09G 3/3406 345/87 |
| 2009/0231268 A1* | 9/2009 | Yamada | G02F 1/167 345/107 |
| 2010/0079428 A1* | 4/2010 | Kajino | G09G 3/344 345/208 |
| 2010/0277453 A1* | 11/2010 | Wang | G09G 3/344 345/211 |
| 2010/0328275 A1* | 12/2010 | Yamazaki | G09G 3/344 345/204 |
| 2011/0010361 A1 | 1/2011 | Burger et al. | |
| 2011/0221794 A1 | 9/2011 | Kim et al. | |
| 2012/0056909 A1 | 3/2012 | Shih et al. | |
| 2012/0127152 A1 | 5/2012 | Masui | |
| 2012/0182282 A1* | 7/2012 | van Veenendaal | G09G 3/344 345/212 |
| 2013/0076721 A1* | 3/2013 | Al-Dahle | G09G 3/3655 345/212 |
| 2013/0278581 A1* | 10/2013 | Al-Dahle | G09G 3/3648 345/212 |

FOREIGN PATENT DOCUMENTS

| | | |
|---|---|---|
| RU | 2446507 C2 | 3/2012 |
| WO | 01/47043 A1 | 6/2001 |
| WO | 01/47045 A1 | 6/2001 |
| WO | 2004/070466 A2 | 8/2004 |
| WO | 2006/056808 A1 | 6/2006 |
| WO | 2006/059162 A1 | 6/2006 |
| WO | 2006/061658 A1 | 6/2006 |
| WO | 2006/106365 A1 | 10/2006 |
| WO | 2007/029028 A1 | 3/2007 |
| WO | 2008/029356 A1 | 3/2008 |
| WO | 2009/133388 A1 | 11/2009 |
| WO | 2012/140434 A1 | 10/2012 |

OTHER PUBLICATIONS

International Search Report and Written Opinion dated Dec. 16, 2013 for International Application No. PCT/GB2013/051794.
Great Britain Search Report Under Section 17(5) dated Nov. 28, 2013 for Application No. GB1212963.1.
Great Britain Search Report Under Section 17(5) dated Jun. 12, 2013 for Application No. GB1212963.1.
Great Britain Updated Search Report Under Section 17(5) dated Nov. 22, 2013 for Application No. GB1212963.1.
Office Action dated Jul. 21, 2017 with Search Report dated Jul. 20, 2017 in corresponding Russian Application No. 2015105780/08(009263).

* cited by examiner

DISPLAY SYSTEMS

CROSS-REFERENCE TO RELATED APPLICATIONS

This application is the U.S. National Phase under 35 U.S.C. §371 of International Application No. PCT/GB2013/051794, filed Jul. 8, 2013, designating the United States and published in English on Jan. 23, 2014 as WO 2014/013223, which claims priority to United Kingdom Application No. 1212963.1, filed Jul. 20, 2012.

FIELD OF THE INVENTION

This invention relates to methods and systems for suppressing spurious display effects during power down and power up of an electro-optic display. The techniques we describe are particularly advantageous for organic/solution processed thin form display backplanes.

BACKGROUND TO THE INVENTION

In a typical active matrix display each pixel is provided with a transistor, more particularly a thin film field effect transistor (TFT, FET) which is used to control the appearance of the pixel. Broadly speaking, the gate connection of the FET is connected to a select line to select the pixel for writing data, and one of the source and drain of the FET is connected to a data line for writing data to the pixel, the other being connected to a pixel electrode for driving the display medium. In some types of display, for example, electronic paper displays such as electrophoretic displays, the pixel electrodes are located on one face of the display medium and a common electrode is provided covering the opposite face of the display medium thereby enabling an electric field to be provided across the display medium, for example to switch the device from one display state, say white, to another say black (or vice versa). The skilled person will appreciate that pixel circuits may in practice be more complex than this, but the same general features remain.

One problem in such displays is parasitic capacitance between the gate and pixel electrodes; in an electrophoretic display this can be exacerbated by the presence of the common pixel electrode, which is used to provide a bigger pixel capacitance. Active matrix displays, where the pixel voltage or current is controlled by one or more thin film field effect transistors, dominate electronic display design. In, say, a top-gate transistor TFT (either a top-gate or a bottom-gate configuration may be employed) the gate electrode needs to overlap with the semiconducting channel and the overlap regions between the gate electrode and the source and drain electrodes determine the parasitic gate-source and gate-drain overlap capacitance $C_{gs}$ and $C_{gd}$, respectively.

These should generally be as small as possible to improve the switching speed of the TFTs and minimize unwanted capacitive coupling effects. In an active matrix display $C_{gs}$ is particularly important as it determines the capacitive coupling between the signals running along the gate lines and the pixel electrode. When the gate voltage is switched to turn off the TFT at the end of a particular addressing (pixel charging) cycle Cgs causes the voltage on the pixel to tend to follow the switching of the gate voltage. This so-called kickback voltage offsets the pixel voltage from the intended value to which the pixel had been charged with the signal on the data line, and has a deleterious effect on the visual appearance of the display. This problem with parasitic capacitance becomes important when $C_{gs}$ is large and the problem is particularly acute with flexible substrates, such as plastic substrates because plastic substrates exhibit significant dimensional changes when subject to mechanical stress or temperature variations both of which occur during any manufacturing process. Further, by comparison with structures on silicon or glass, thin film transistors (TFTs) on a plastic substrate tend to be physically larger and to thus exhibit a larger capacitance.

A pixel capacitor can be used to reduce the effect of the parasitic overlap capacitance as the kickback voltage induced on the pixel electrode by the switching gate voltage is smaller the larger the capacitance of the pixel electrode is. The display medium itself has a capacitance so that a pixel capacitor may comprise capacitance between a pixel electrode (source or drain electrode of a pixel drive TFT) and a pixel capacitor counter electrode, which may simply comprise a common electrode extending over a (front) surface of the display (the backplane being on the display rear surface). Thus the common pixel electrode may be a substantially transparent electrode on the viewing surface side of the display.

Pixel capacitors are particularly important when used in conjunction with thicker display media such as electronic paper where the thickness of the display effect, such as an electrophoretic media, leads to a lower capacitance of the display element itself. In these displays the pixel capacitor can take up a significant fraction of the pixel, especially where the kickback effect is large. For example, in our patent application WO2009/133388 (US2011/010361) we have described how an off-set pixel electrode can be used to achieve increased storage capacitance. In such an off-set configuration the top pixel electrode is deposited to overlap the first capacitor plate (COM electrode) of one device and also the gate electrode of a neighbouring device.

Figure 1A:
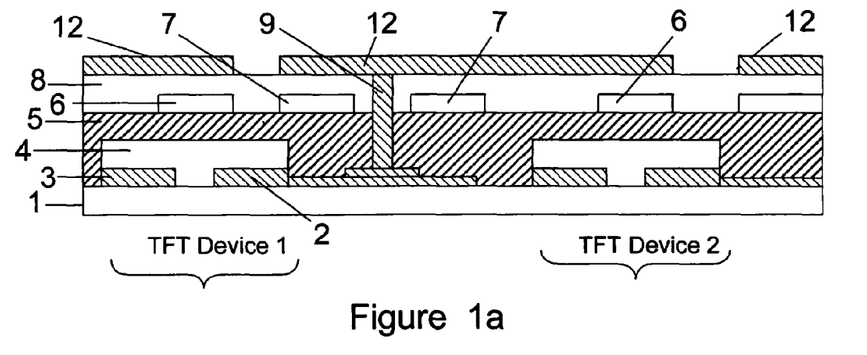
FIGS. 1a and 1b show, respectively, a vertical cross-section (along a staggered line) through a portion of an active matrix backplane showing a second example active matrix pixel driver circuit including a multi-layer transistor structure and pixel capacitor, with an off-set the top pixel electrode configuration for reduced kickback, and the structure of FIG. 1a from above.
Figure 1B:
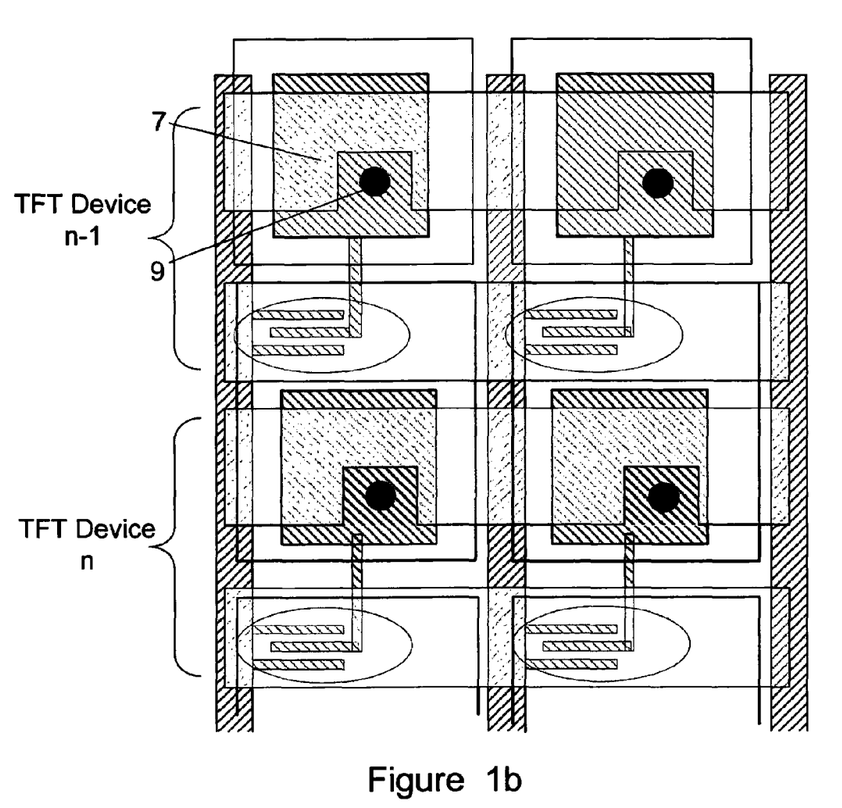

Referring to FIG. 1a, this shows a vertical cross-section (along a staggered line) through an example of such an active matrix backplane structure. In FIG. 2a a substrate 1 bears a thin film transistor (TFT) device comprising source and drain electrodes 2,3, a layer of semiconducting material 4, a gate dielectric 5 and a gate electrode/interconnect 6. A COM electrode 7 is formed in the same later as gate electrode 6. An upper dielectric 8 overlies the gate and COM electrodes and a top pixel electrode 12 is provided over dielectric layer 8, connected to one of the source/drain electrodes by a via 9. FIG. 1b shows the structure from above, illustrating that the COM electrode is patterned to provide a non-conducting cut-away for via 9. The top pixel electrode overlaps with the COM electrode (Cn) 7 of the first device (Device 1) and the gate electrode (Gn+1) of the neighbouring device (Device 2).

Storage capacitance $C_{Storage}$ is obtained from an overlap between the COM electrode and the drain electrode. The effect of an off-set top pixel electrode is an increase in overall storage capacitance caused by an overlap between the top pixel electrode and the COM electrode as well as between the top pixel electrode and the gate ($G_{n-1}$). The parasitic capacitance between the gate electrode and the drain electrode remains unchanged but the parasitic capacitance between the top pixel electrode and the gate electrode decreases and thus the storage capacitance ($C_{storage}$) may be increased by lowering the top pixel dielectric thickness. This increases the overall $C_{Storage}/C_{Parasitic}$ capacitance ratio, thus increasing overall pixel capacitance and reducing kickback voltage and variation. The top pixel dielectric layer may be tuned to maximise $C_{storage}$, without increasing $C_{parasitic}$.

We have previously described techniques to address the problems of gate kickback, for example in our PCT/GB2012/050813. There are, however, other problems which are not easy to understand. For example, particularly when using an organic TFT (thin film transistor) backplane on a flexible, plastic substrate some regions of a non-volatile (electronic paper) display can end up darker than others after the backplane has been powered down.

SUMMARY OF THE INVENTION

The inventors have determined that display effects can arise from spurious driving of the electro-optical media during power-down and power-up of the display. This results from non-uniform and non-ideal performance of the active devices in the backplane. More particularly the inventors have determined that the problem of darkening of areas or single pixels seen on powering-down of a display is due to regions of pixels with pixel electrodes leaking towards one or more of a data line, a gate line, and a BPCOM (backplane common) line. Having determined this, the inventors have further determined that the problem may be addressed by modifying the power down sequence such that the voltage of the pixel electrodes is closer to zero volts after power down instead of having a long negative tail. The inventors have further identified a method of achieving this to reduce interpixel non-uniformities in a displayed image.

According to the present invention there is therefore provided a method of reducing artefacts in an image displayed by an active matrix electro-optic display and display driver, the electro-optic display driver comprising a plurality of active matrix pixel drivers each driving a respective pixel of the electro-optic display, each active matrix pixel driver having an associated storage capacitor coupled to a common backplane connection of the display driver, pixels of the electro-optic display having a common pixel electrode, the method comprising: driving the electro-optic display with a null frame during a power-down procedure of the display.

In embodiments the null frame comprises a frame of data values (values on the data lines of the display driven to the pixels) defining no change in a displayed pixel colour or "brightness" level. Broadly speaking in embodiments driving the null frame pulls the voltage of non-leaky pixel electrodes back in a positive direction, together with a TPCOM (top common pixel electrode) voltage, which drives the leaky pixels towards a background colour of the display, in embodiments white. The skilled person will appreciate that operation of the technique is not dependent on any particular form of pixel driver circuit but is more to do with the various leakage resistances and capacitances (parasitic and otherwise) between elements of an active matrix pixel.

In preferred embodiments of the method the common pixel electrode is disconnected from a power supply such that this electrode is floating, prior to driving the display with the null frame.

Preferably, but not essentially, the procedure clamps one or both of the common backplane connection and a pixel select line (gate line) of the active matrix display driver prior to driving the null frame. Alternatively, however, one or both of these may be clamped after driving the null frame. One or both of these connections/set of connections may be clamped to zero volts, but in a variant/improvement of the technique one or both may be clamped at an intermediate voltage level prior to clamping to zero volts. This helps to address a problem, described later, which can occur on (repeated) power-up of the display after power down. Further such an approach may be employed during a power up procedure.

As previously mentioned, in embodiments driving with a null frame drives the voltage level on the common pixel electrode towards a background colour, in embodiments, driving the voltage towards zero and optionally slightly positive: that is applying the method may change the sign of the voltage on the common pixel electrode or bring this voltage to substantially zero (zero volts across a display).

One side effect of the above described driving with a null frame, in particular with TPCOM disconnected during power-down and/or power-up is a "fade effect" in which some pixels (the first to be addressed) are driven towards a colour/brightness extreme (for example, whiter or blacker) more than other pixels. To address this, rather than write the display lines sequentially multiple display lines may be written in parallel, selecting (enabling) a plurality of the pixel select lines simultaneously. This speeds up display of the null frame, helping to reduce the fade effect. Depending upon the pixel configuration, optionally alternate ones of the pixel select lines may be selected (enabled) simultaneously. For example in our offset pixel design (US2011/010361 ibid), where the top pixel electrode is offset to overlap the common electrode and also the gate electrode of the neighbouring device (for greater storage capacitance) alternate rows of pixel may be enabled in successive sets to help control the voltage level to which the common pixel electrode rises.

As previously mentioned, related effects can arise during a power-up sequence of a display-driver combination. More particularly the above described power down sequence can itself give rise to a spurious display effect and thus some preferred embodiments of the technique also modify the power-up sequence to compensate for a tendency of the display to change away from a background colour (for example, white), in particular during repeated null frame drive, for example on repeated power-up cycles. Such cycles can occur, for example, in an implementation in which the display/driver is powered-up on detection of a key stroke or touch to display some feedback resulting from the keystroke/touch, then powering-down once again. This is especially a problem where, for example, a line or key image is displayed, that is where there is a relatively small change to the displayed image and where most of the displayed image comprises a null frame. These effects can be mitigated by displaying a preconditioning null frame during the power-up procedure.

More generally aspects of the invention contemplate a modified power-up sequence which involves displaying a null frame in a corresponding manner to the above described aspects and embodiments of the invention.

Thus in a related aspect the invention provides a method of powering-up an active matrix electro-optic display and display driver, the display driver comprising a plurality of active matrix pixels, the method comprising displaying a preconditioning null frame during said power-up procedure.

In embodiments the method further comprising one or both of: powering the common backplane connection to a defined backplane voltage level after displaying the preconditioning null frame, and powering the common pixel electrode to a defined common pixel voltage level after displaying the preconditioning null frame.

The invention further contemplates each of the previously described features of the power-down procedure, implemented in the context of the above described powering-up aspect of the invention. Thus, for example, embodiments of the powering-up method may similarly comprise driving a plurality of the pixel select lines of the display simultaneously, to provide a very fast null. Additionally or alternatively two null frames may be employed in a power up procedure, in particular between defining a gate line voltage level (for the gate lines) and defining a voltage level for the common backplane connection.

In a related aspect the invention provides an active matrix electro-optic display driver, the electro-optic display driver comprising a plurality of active matrix pixel drivers each driving a respective pixel of the electro-optic display, each active matrix pixel driver having an associated storage capacitor coupled to a common backplane connection of the display driver, pixels of the electro-optic display having a common pixel electrode, the display diver further comprising a system to drive the electro-optic display with a null frame during a power-down procedure of the display.

In a further related aspect the invention provides an active matrix electro-optic display driver, the electro-optic display driver comprising a plurality of active matrix pixel drivers each driving a respective pixel of the electro-optic display, each active matrix pixel driver having an associated storage capacitor coupled to a common backplane connection of the display driver, pixels of the electro-optic display having a common pixel electrode, the display diver further comprising a controller to display a preconditioning null frame during a power up procedure of the display.

The fast update technique described above is potentially usable to drive a display with other than a null frame, for example to update all or part of a displayed image where one or more rows of the update have portions of data in common. (The skilled person will recognise that, in this context, which are labelled rows and which are labelled columns of the display).

Thus in a further aspect the invention provides a method of updating an image displayed by an active matrix electro-optic display and display driver, the electro-optic display driver comprising a plurality of active matrix pixel drivers each driving a respective pixel of the electro-optic display, each active matrix pixel driver having an associated storage capacitor coupled to a common backplane connection of the display driver, pixels of the electro-optic display having a common pixel electrode, wherein each active matrix pixel driver comprises a driver transistor, coupled to said storage capacitor, having a data input line to define a voltage level on said storage capacitor and having a control input coupled to a pixel select line, the method comprising: determining that, for at least one said data line of said active matrix electro-optic display, a plurality of rows of said display are to be written with the same data to update a displayed image; selecting a plurality of said pixel select lines simultaneously to select said plurality of rows of said display; and driving the electro-optic display with a updated data for said selected rows of said display.

In a further related aspect the invention provides an active matrix electro-optic display driver, the electro-optic display driver comprising a plurality of active matrix pixel drivers each driving a respective pixel of the electro-optic display, each active matrix pixel driver having an associated storage capacitor coupled to a common backplane connection of the display driver, pixels of the electro-optic display having a common pixel electrode, wherein each active matrix pixel driver comprises a driver transistor, coupled to said storage capacitor, having a data input line to define a voltage level on said storage capacitor and having a control input coupled to a pixel select line, the display driver comprising a controller to: determine that, for at least one said data line of said active matrix electro-optic display, a plurality of rows of said display are to be written with the same data to update a displayed image; select a plurality of said pixel select lines simultaneously to select said plurality of rows of said display; and drive the electro-optic display with a updated data for said selected rows of said display.

The skilled person will recognise that systems for embodiments of the above described aspects of the invention may comprise dedicated hardware, for example an application specific integrated circuits (ASIC), or software, for example non-volatile memory storing processor control code in combination with a control processor, or some combination of hardware and software. The skilled person will further appreciate that functions of the above described display drivers may be distributed between a plurality of coupled components in communication with one another.

In some particularly preferred embodiments of the above described methods and systems the display driver comprises organic or solution processed thin film transistors and the active matrix pixel driver circuitry is fabricated on a flexible substrate, in particular using solution deposition techniques: the techniques we describe are particularly advantageous for "plastic electronics". For example a display driver fabricated on a thin sheet of PET (polyethylene terephthalate) or PEN (polyethylene naphthalate) because these tend to have relatively large parasitic capacitance and leakage, especially when subject to temperature and dimensional changes.

Preferably in the devices we describe here and later the backplane is fabricated using solution-based thin film transistors (TFTs) preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 (which describes a four or five layer pixel architecture) and PCT/GB2006/050265, all hereby incorporated by reference in their entirety. Thus the TFTs may comprise an organic semiconductor material, for example a solution processable conjugated polymeric or oligomeric material, and some preferred implementations the display, more particularly the backplane, is adapted to solution deposition, for example comprising solution-processed polymers and vacuum-deposited metals.

The electro-optic display is preferably a flexible display, more particularly an electronic paper display. In embodiments the display is an electrophoretic display, but the techniques we describe are also advantageous for describing other types of electronic paper such as an electrowetting or electrofluidic display.

In embodiments the display is a monochrome display and the positive and negative gate/source voltages, and extremal (maximum/minimum) values between which the pixel electrode is switched, broadly correspond to "black" and "white" pixel values. The skilled person will appreciate, however, that the techniques we describe are not limited to monochrome displays and may straightforwardly be applied to a colour display.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 2:
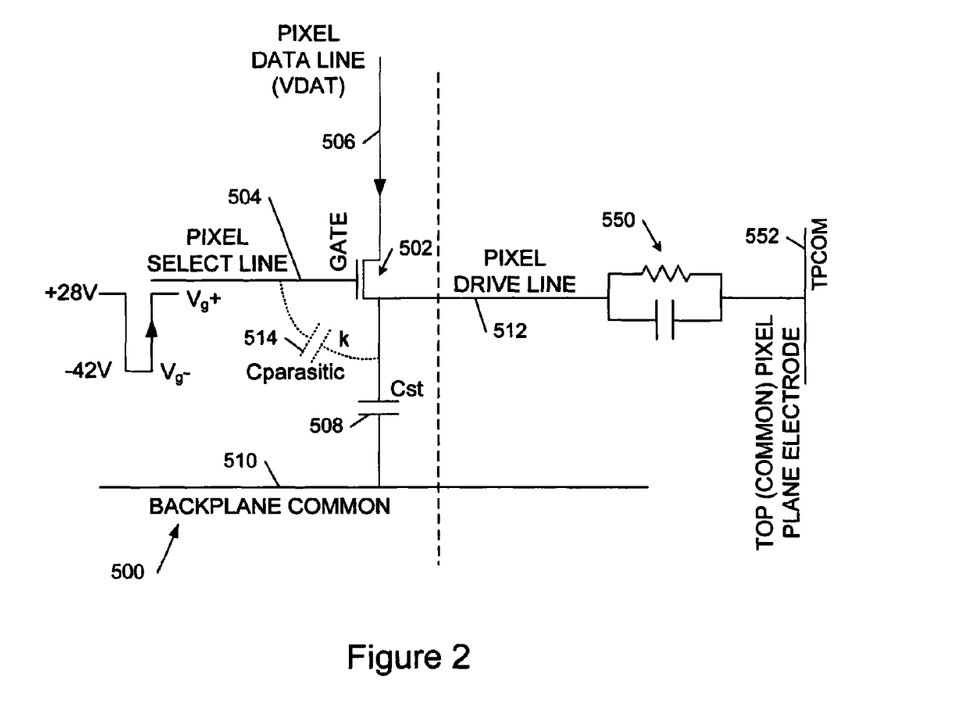
FIG. 2 shows an example of a pixel driver circuit on a flexible plastic backplane, in combination with a pixel of an electrophoretic display.

Referring to FIG. 2, this shows an example of a pixel driver circuit 500 fabricated using solution deposition techniques on a flexible plastic backplane, in combination with a pixel 550 of an electrophoretic display. In FIG. 2 the portion to the right hand of the dashed line constitutes the electrophoretic display and the portion to the left side of the dashed line, the active matrix backplane; these are sandwiched together to make an active matrix display.

The pixel driver circuit of FIG. 2 comprises a thin film transistor 502 having a gate connection 504 which is connected to a pixel select line of the display. When activated a voltage on pixel data (VDAT) line 506 is coupled to one plate of storage capacitor Cst 508, the other plate of which is connected to a backplane common connection 510. The junction between transistor 502 and storage capacitor 508 also provides a pixel drive line 512 which is connected to the electrophoretic display pixel 550. Pixel 550 may be modelled as a high value resistor, for example of order 800MΩ, in parallel with a small capacitor, for example less than 1 pF. A second connection of the electrophoretic display pixel is connected to the common or top pixel electrode, TPCOM 552.

In operation, when the pixel select line 504 is activated the voltage on line 506 is applied between the pixel drive line 512 and TPCOM 552, and is also stored on capacitor 508. A typical voltage range for line 506 is between −16 volts (white) and +16 volts (black). FIG. 2 illustrates an example gate drive waveform on the pixel select line going between +28 volts and −42 volts, that is approximately a 70 volt swing. When the gate voltage returns from its negative value to its positive value, deselecting transistor 502, parasitic capacitance illustrated by capacitor 514 couples a proportion of this voltage to the pixel drive line 512. For organic/solution-deposited devices on a plastic substrate the parasitic capacitance is relatively large and a (gate kickback) voltage of order 10 volts may be coupled to the pixel drive line. This is a substantial proportion of the black-white voltage range.

When driving an electrophoretic display pixel, because of the relatively slow response of such displays a single pixel may be written to perhaps every 20-30 ms, to maintain a drive to the pixel. In a practical device there is some leakage due to resistance between the TPCOM plane 552 and one or both of the gate voltage power supplies (this leakage resistance is not shown in FIG. 2). Also, in general, the TPCOM plane 552 will be coupled, at least indirectly to the backplane 510.

Due to the relatively slow update rate of an electrophoretic display to speed the display up only a small region of the display may be updated: Often, for example when typing, only a small region of the display changes. The remainder of the display is written with a null frame, that is with a voltage on line 506 of zero volts, which for an electrophoretic display corresponds to no-change in the displayed "colour". However if the voltage actually experienced by the pixel is not zero, there is a gradual drift towards either black or white. The visibility of such drift imposes tight constraints on accurately controlling the pixel voltage. The difficulty of this is exacerbated in electronic paper displays with plastic backplanes because the characteristics of the display and the performance of the driver circuitry also depend upon temperature, ageing, humidity and the like.

Figure 3:
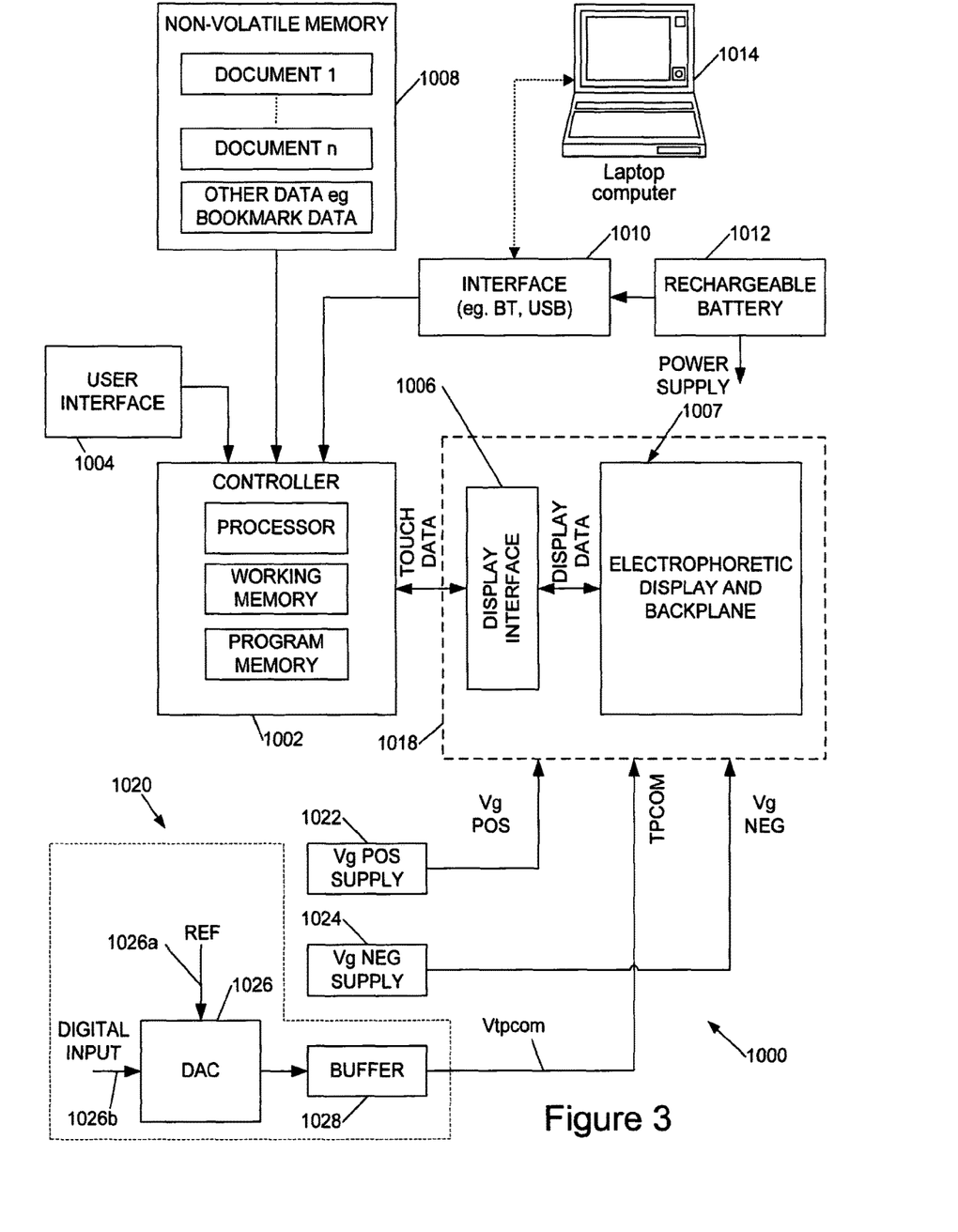
FIG. 3 shows a block diagram of an electronic device including an active matrix electro-optic display and driver.

FIG. 3 shows a block diagram of an example electronic device, here an electronic document reader 1000, including an active matrix electro-optic display and driver, in this example including a gate kickback voltage adjustment system 1020.

The electronic document reader 1000 comprises a controller 1002 including a processor, working memory and programme memory, coupled to a user interface 1004. The controller 1002 is also coupled to an active matrix backplane and electrophoretic display 1007 by a display interface 1006, to send electronic document data to the display and, optionally, to receive touch-sense data from the display (where a touch sensor is provided for the display). The control electronics also includes non-volatile memory 1008, for example Flash memory, for storing data for one or more documents for display and, optionally, other data such as user bookmark locations and the like. An external wired or wireless interface 1010, for example USB and/or Bluetooth™, is provided for interfacing with a computer such as a laptop 1014, PDA, or mobile or 'smart' phone to receive document data and, optionally, to provide data such as user bookmark data. A rechargeable battery 1012 or other rechargeable power source is connected to interface 1010 for recharging, and provides a power supply to the control electronics and display.

The power supply to the display/interface system 1018 (shown enclosed by a dashed line) includes positive and negative gate voltage supplies Vg POS, Vg NEG and a Common Voltage supply Vcom. In FIG. 3 Vg POS and Vg NEG are provided by respective gate voltage power supplies 1022, 1024. In embodiments the difference between Vg POS and Vg NEG, Vgswing, can be relatively large, for example ~70 volts. The gate kickback voltage adjustment system 1020 comprises a digital-to-analogue converter (DAC) 1026 with an output driving a buffer 1028 which in turn provides voltage V(TPCOM) 552 to display/interface system 1018. The DAC 1026 has a digital input 1026b, for example from controller 1002, and a reference input 1026a and is configured to generate an output voltage which depends on the digital input value scaled by a signal level (voltage) on the reference input 1026a.

The digital input may be set by controller 1002 at an approximately correct value and then adjusted by adjusting the voltage (or current) on the reference input 1026a. In some embodiments this adjustment may be calculated or, alternatively, it may be set at manufacture (of the display or e-reader), by adjusting one or both of the digital input value and the reference level to optimise the visual appearance of the display or to minimise (or null) a measured gate kickback voltage. In embodiments the value of the digital input and/or reference determined in this way may be stored in the non-volatile memory 1008. In an example embodiment the DAC reference level was ~1 volt and the value of Vcom was ~10.5 volts.

Suppression of Spurious Display Effects

During power-down of the backplane voltage supplies, care must be taken not to drive the electro-optical media in a manner which would result in degradation or corruption of the displayed image. This is particularly important when pixels of the electro-optical media are driven by organic TFTs rather than amorphous silicon TFTs, due to the higher voltages employed for driving. Capacitive couplings of the gatelines and the backplane common electrode (BPCOM) with the pixel electrodes are considerably higher with organic TFTs, with a consequent greater risk of driving the media. In the previous example the display medium is a voltage driven display medium that gets darker when a positive voltage is applied to the pixel electrode (preferenced to TPCOM) on the backplane.

Figure 4:
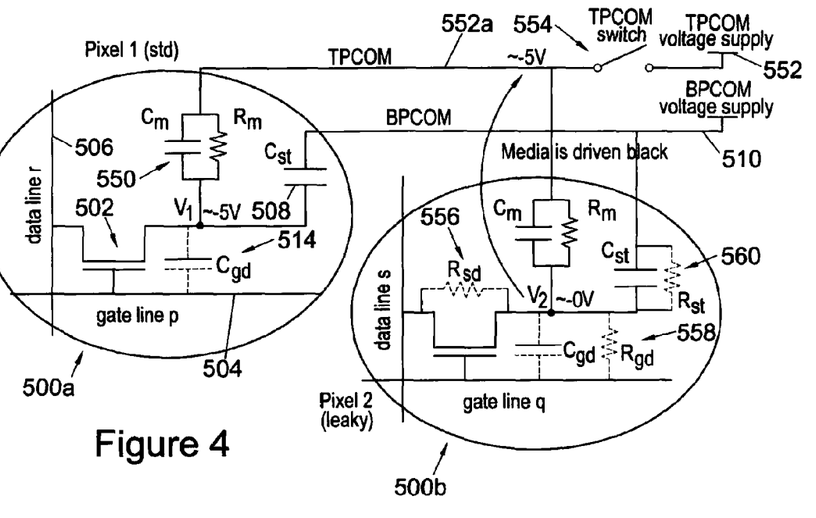
FIG. 4 shows examples of non-leaky and leaky pixel driver circuits illustrating the effect of a leaky pixel on the voltage applied to the electro-optic display media.

To address this, at the end of an update of the display, and before power-down, that is when the voltage across the display media is zero volts, the top plane common electrode (TPCOM) may be electrically disconnected from its voltage supply by means of an electrical switch, for example a MOSFET, TPCOM switch 554 in FIG. 4. This enables the voltage of TPCOM to freely track the voltage of the pixel electrodes during power-down without causing a substantial potential difference to appear across the media.

Figure 6:
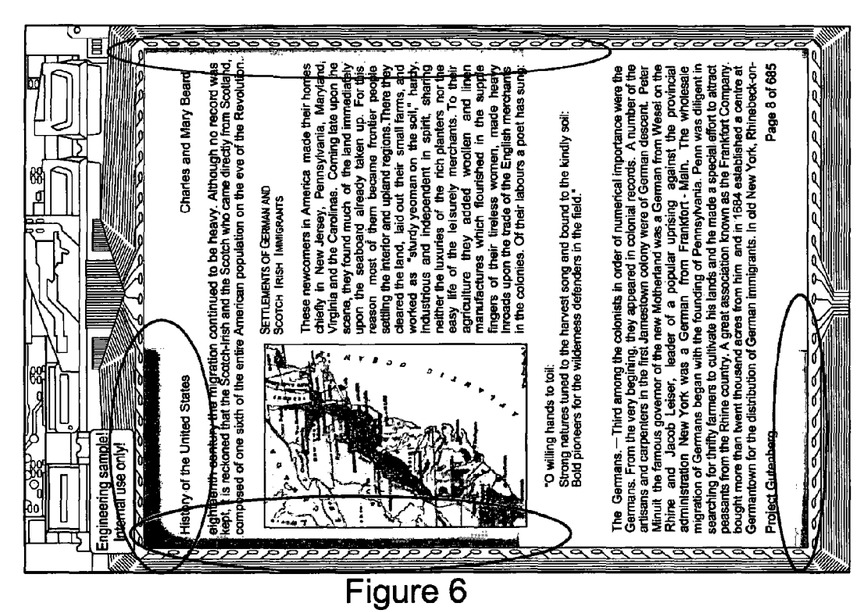
FIG. 6 illustrates darkening of display edges due to a combination of the negative voltage tail and the presence of leaky pixels.

FIG. 4 shows a pair of active matrix pixel driver circuits 500a, b, each of the type shown in FIG. 2 (and in which like elements are indicated by like reference numerals). Active matrix pixel 500b is leaky as compared with pixel 500a and shows three different types of leakage resistance which may be present, Rsd 556 representing source-drain leakage across the driver transistor, Rgd 558 representing gate-drain leakage through the driver transistor and Rst 560 representing leakage through storage capacitor 508. In the illustrated example the pixel electrode of the normal pixel 500a is at a voltage $V_1$ of approximately −5 volts and TPCOM is at approximately the same voltage so that there is a null drive on this pixel. However leaky pixel 500b has a pixel electrode at a voltage $V_2$ of approximately zero volts due to leakage through one or more of Rsd, Rgd and Rst, and thus the pixel electrode is positive with respect to TPCOM and the media is driven towards the black. This is a problem since the image background is typically white. The ringed portions of FIG. 6 illustrate this problem, in particular the darkening of the display edge after power-down of the display, due to high leakage pixels around edges of the display.

Figure 5:
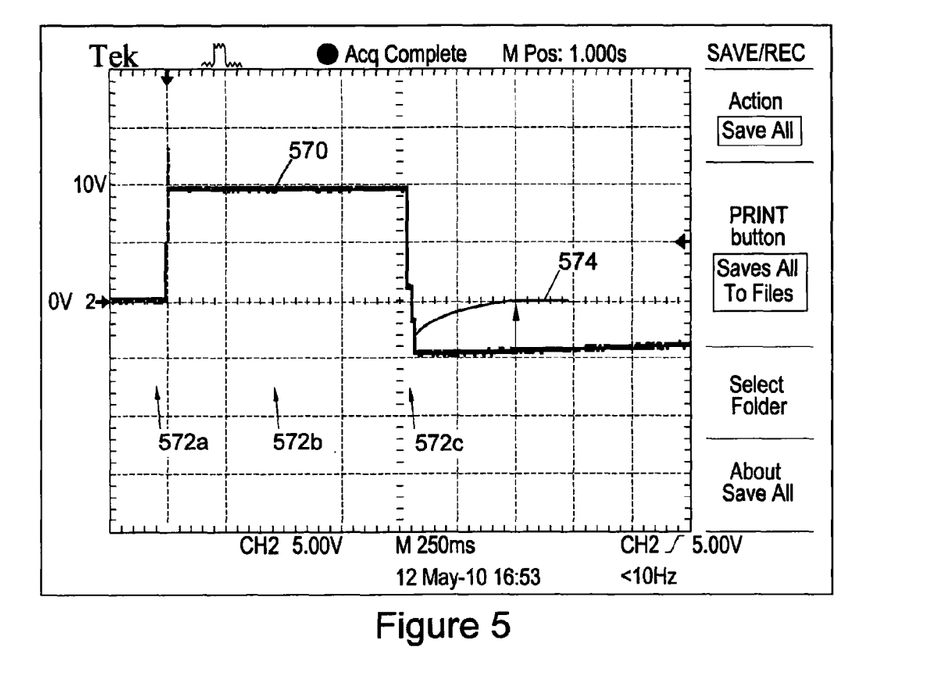
FIG. 5 shows variation of the TPCOM (pixel plane common electrode) voltage of FIG. 4 during power-up display update, and power-down, illustrating a negative voltage tail.

FIG. 5 shows an example oscilloscope trace 570 of the voltage on the top plane common electrode TPCOM (line 552a of FIG. 4) from power-up 572a, through a display update 572b, to power down 572c with an unmodified drive scheme. During the update 572b, TPCOM is driven to a set voltage, in this example 10 volts. On power-down, the capacitive coupling to the gatelines, in combination with BPCOM being clamped to zero volts, causes the pixel electrodes to see a negative voltage, with a voltage variation given by, approximately:

$$\Delta V_{pixel} = \Delta V_{gate} \frac{C_{gd}}{C_{gd} + C_{st}} + \Delta V_{BPCOM} \frac{C_{st}}{C_{gd} + C_{st}}$$

The TPCOM voltage is an average determined by coupling from the individual pixel electrodes.

In an a-Si backplane the BPCOM voltage may be kept at 0V. However embodiments of the display driver implemented using a solution-deposited/organic backplane hold BPCOM at a voltage different to 0V, in embodiments a voltage substantially equal to the TPCOM voltage. This suppresses a parasitic TFT in the particular stack employed and improves display uniformity (in particular Black NFD uniformity). Therefore in embodiments of the display driver BPCOM is clamped at the end of the update, and this (also) contributes to the appearance of a negative voltage on the pixel electrodes, which causes the blackening of the leaky pixels.

Ideally the voltages of the pixel electrodes, $V_1$ and $V_2$ in FIG. 4, should always be the same during power-down. Since the gatelines and BPCOM are driven in parallel, this ideal should be achieved if the individual pixels/drivers are identical. However in practice due to a range of reasons such as light exposure, heat exposure, bias stress, and pixel defects, some pixel electrodes may become leaky during the operation and lifetime of the product: thus the leakage resistance between a pixel electrode and its data line and/or BPCOM and/or its dateline can reduce and, in general, this effect will be non-uniform across pixels. A leaky pixel or region of leaky pixels will have a more positive voltage across the display media, that is the pixel electrode voltage will be closer to zero volts because of the increased leakage to the datalines, gatelines or BPCOM as compared with normal, non-leaky pixels. Curve 574 of FIG. 5 illustrates, schematically, the potential difference between high leakage peak pixels (curve 574) and standard pixels (curve 570). The effect of the leakage is to cause the leaky pixels to drive the media towards black at power-down, and this tends to be readily visible on a white background, as shown in FIG. 6.

Figure 8:
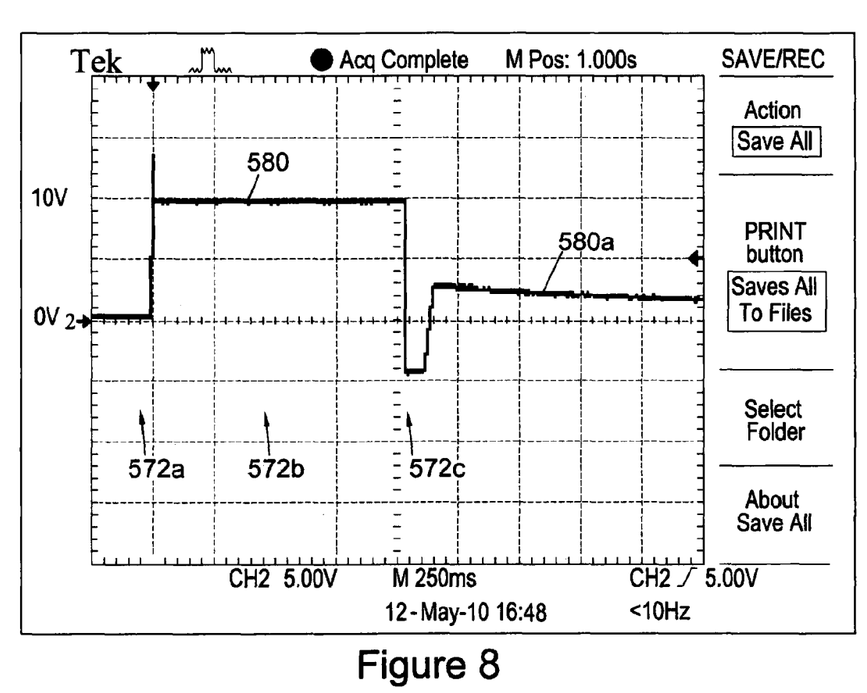
FIG. 8 illustrates a variation of the TPCOM voltage during power-up, display update, and power-down when employing the modified power-down procedure, illustrating a positive voltage tail.
Figure 9:
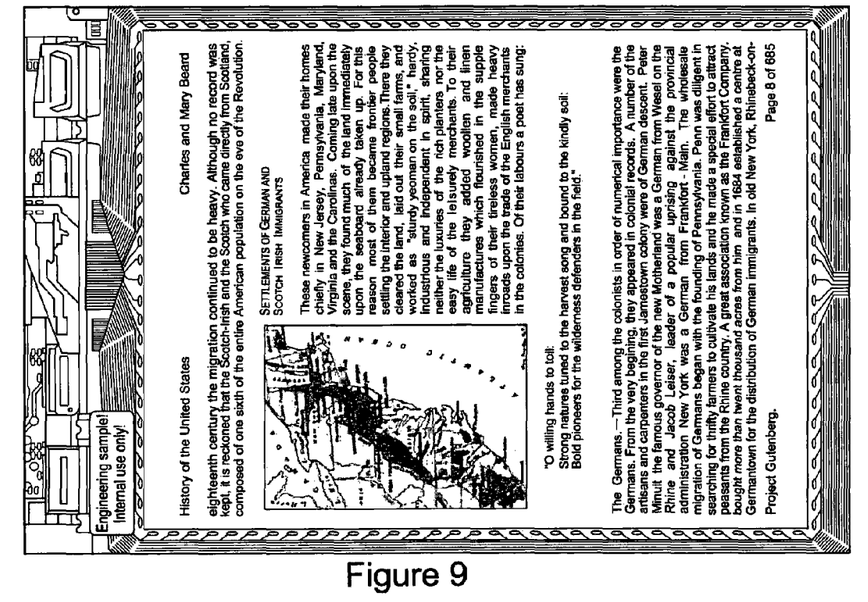
FIG. 9 illustrates the appearance of the display after power-down using the modified power-down procedure.

In embodiments of the invention we address the above problem by driving a null frame after (i) TPCOM is disconnected from its voltage supply by switch 554; and (ii) the gatelines and BPCOM are clamped to zero volts. (As described later, however, optionally the clamping to zero volts may be performed only after the null frame). The result of this procedure is that the voltage of non-leaky pixel electrodes is pushed back positive, together with the TPCOM voltage. (Referring to voltages in FIG. 4, the non-leaky pixel electrodes are pulled towards zero volts which, in turn, pulls TPCOM towards zero volts, that is in a positive direction). The effect of this is shown in the TPCOM trace 580 of FIG. 8, which shows that following driving this null frame the TPCOM voltage exhibits a positive tail 580*a*, which drives the leaky pixels towards white. In embodiments the TPCOM voltage need not be driven positive since there is benefit in merely reducing the negative voltage tail of TPCOM shown in FIG. 5 to bring TPCOM closer to zero volts. However because the image background is typically white, a slightly positive voltage tail is also acceptable: because of the white background of typical images, no noticeable difference is visible after power-down, making this an effective procedure for suppressing the dark image regions due to high leakage pixels. FIG. 9 shows the same display as FIG. 6, but employing this modified power-down procedure. As can be seen, the dark pixels around the edges of the display are no longer present.

In embodiments of the modified procedure, because of the dielectric absorption or remnant voltage of the media, the TPCOM voltage and the pixel voltage(s) may differ (the difference decaying to zero volts during power-down), but nonetheless the aforementioned advantages are still provided.

Figure 7:
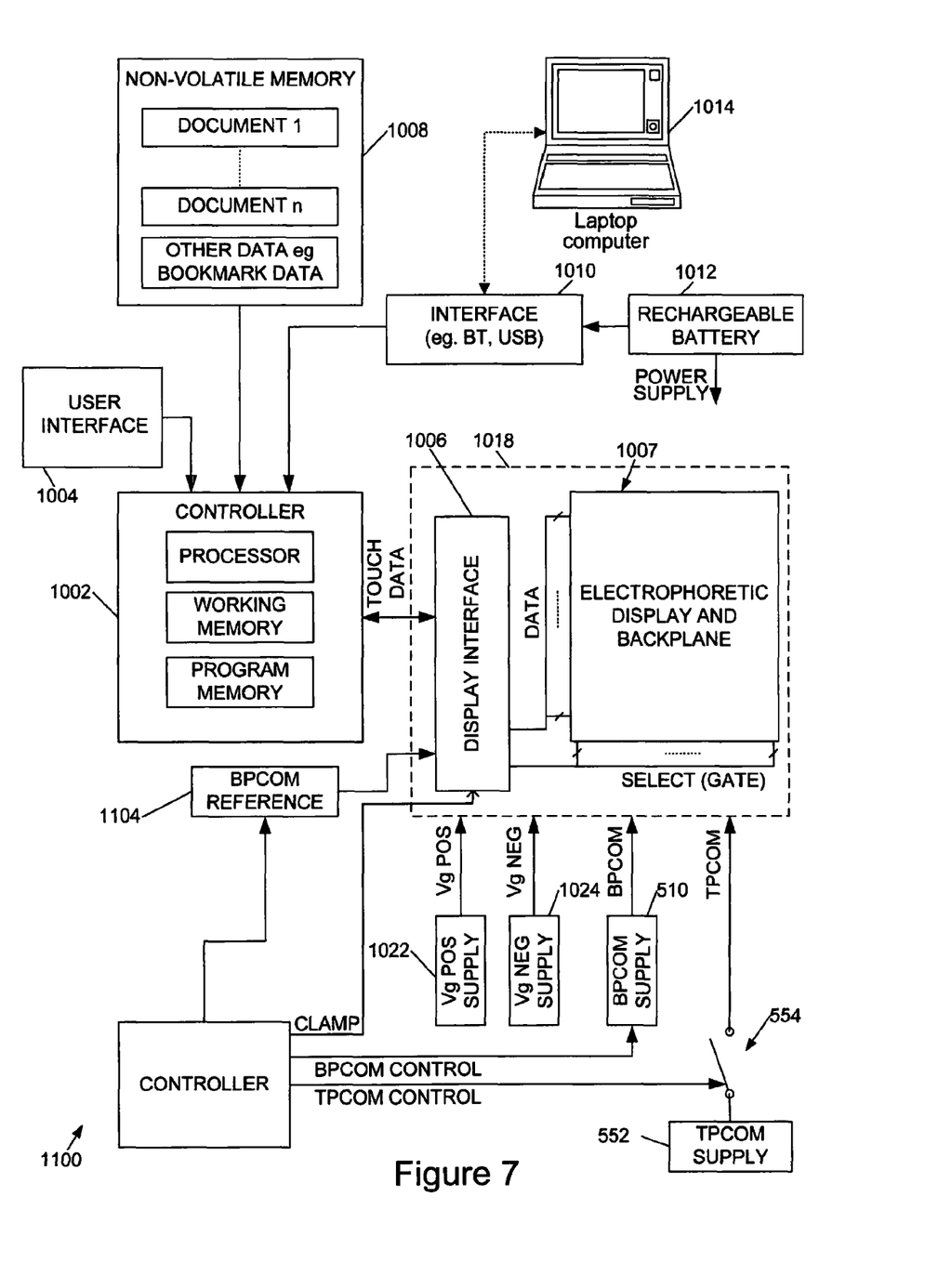
FIG. 7 shows a block diagram of an electro-optic display and driver configured to implement a modified power-down procedure to reduce the negative voltage tail FIG. 5.

Referring now to FIG. 7 this shows a block diagram of an electro-optic display and driver configured to implement an embodiment of the above described power-down procedure. (The system of FIG. 7 may also be employed to implement a modified power-up procedure as described later, additionally or alternatively to the power-down procedure). Like elements to those previously described with reference to FIG. 3 are indicated by like reference numerals; a gate kickback compensation system will also generally be present but is not shown, for clarity.

Thus the device 1100 of FIG. 7 incorporates a TPCOM supply 552 as previously described together with a TPCOM switch 554, and a BPCOM supply 510. A controller controls switch 554 and also BPCOM supply 510 in order to be able to clamp the BPCOM supply to zero volts. In FIG. 7 the gate (select) and datalines are shown explicitly, and the controller 1102 provides a further control output to the display interface 1006 to clamp the gate (select) lines. In embodiments a further BPCOM reference supply 1104 is provided, again under control of controller 1102, to implement a further modified power-down/power-up procedure in which there is partial clamping of BPCOM before the null frame.

Figure 10:
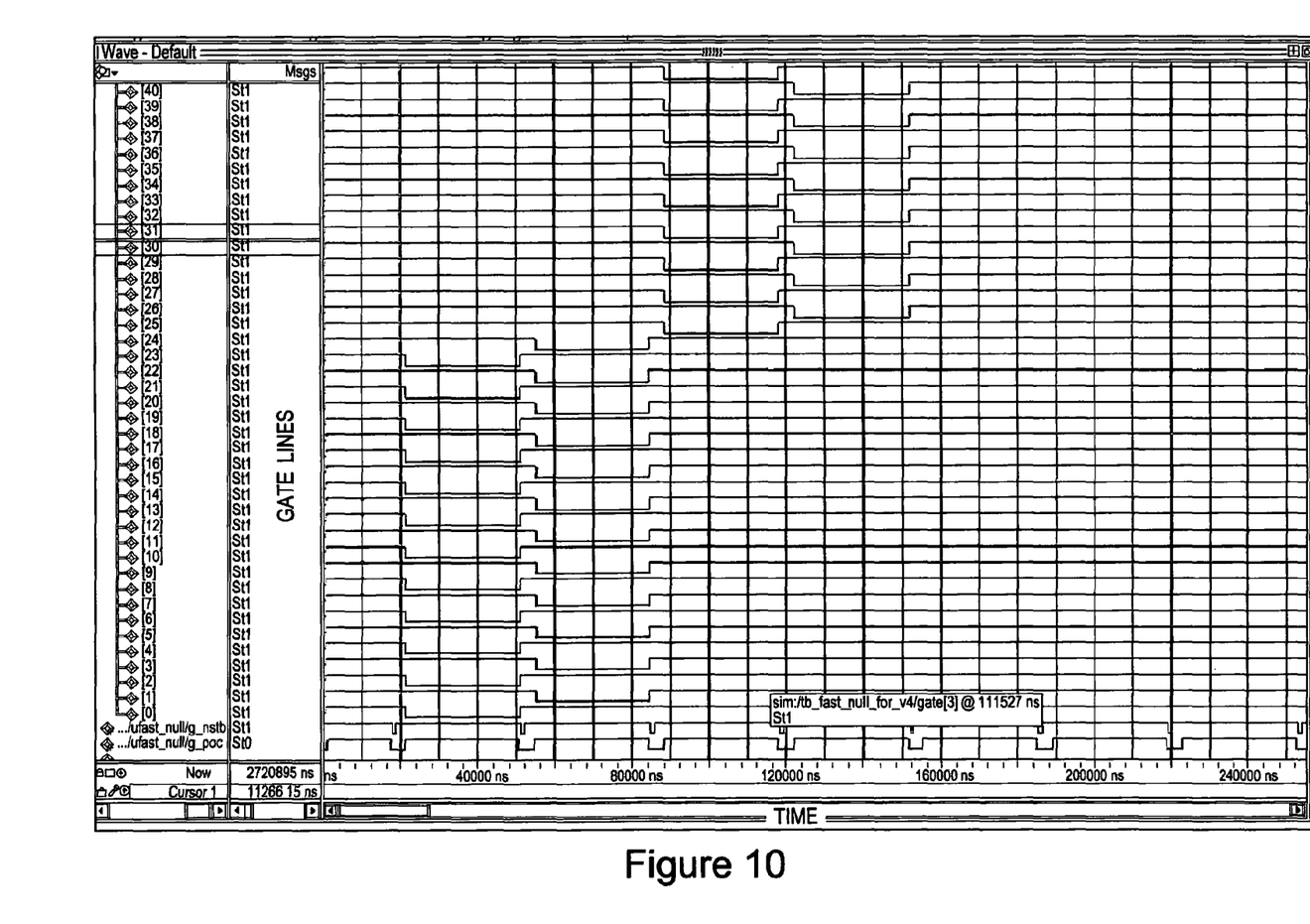
FIG. 10 illustrates an addressing scheme for rapid implementation of the modified power-down procedure.

Since the TPCOM voltage increases during the null frame drive the pixels corresponding to the first gatelines to be addressed are driven more (blacker) than the pixels corresponding to the last gatelines to be addressed. The faster the media response, the more evident this fade effect is. The fade affect can be addressed and, in embodiments partially or wholly suppressed by increasing the speed of the null frame, thus reducing the time for the electrical unbalance across the panel to affect the optical state of the display. One approach to increasing the speed of display of the null frame is to address (select) multiple gate lines simultaneously rather than, one at a time. When doing this the number of lines driven simultaneously may be selected so as not to exceed the current limit of the gatedrive circuitry. Where an offset top pixel arrangement is employed, for example as described in US2011/0101361 (incorporated by reference), the datelines should be addressed in the same direction (overlap direction) as normal and preferably in a "combed" sequence where adjacent gatelines are not selected simultaneously. FIG. 10 shows an example set of dateline drive waveforms for such a combed sequence in which 12 lines are addressed at the same time to perform a fast null (in FIG. 10 a low state of a gateline corresponds to the gate (transistor) being open). if such a procedure is not employed then the TPCOM voltage can increase too much and turn on the drive TFT.

We have described embodiments of a modified power-down procedure for a combination of an electro-optic display and flexible organic TFT backplane. However similar techniques can be employed when powering-up a display/backplane combination. In particular driving a preconditioning null frame in a substantially similar manner. The skilled person will appreciate that the arrangement of FIG. 7 may similarly, therefore, be employed to implement such approaches.

If the TPCOM voltage is too high at the end of the power-down sequence, during the next power-up, when capacity of couplings to gatelines and BPCOM take the pixel electrodes and TPCOM to a more positive voltage, the TPCOM voltage can exceed the voltage range of switch 554 which keeps the TPCOM electrode disconnected from its voltage supply. In the circumstances the TPCOM voltage may be clipped to the maximum voltage of the TPCOM switch while the voltage of the pixel electrodes is still free to increase according to the capacity of coupling with the gatelines and BPCOM, and thus the display can then be driven towards the black. Although this is not a problem when an update follows power-up, this can be a problem during repeated null frame drive, for example during a keyboard mode for the device where most of the pixels are not updated after power-up (the device may be powered-up at each key stroke). In such a case the cumulative effect of each power-up can darken the displayed image.

Figure 11:
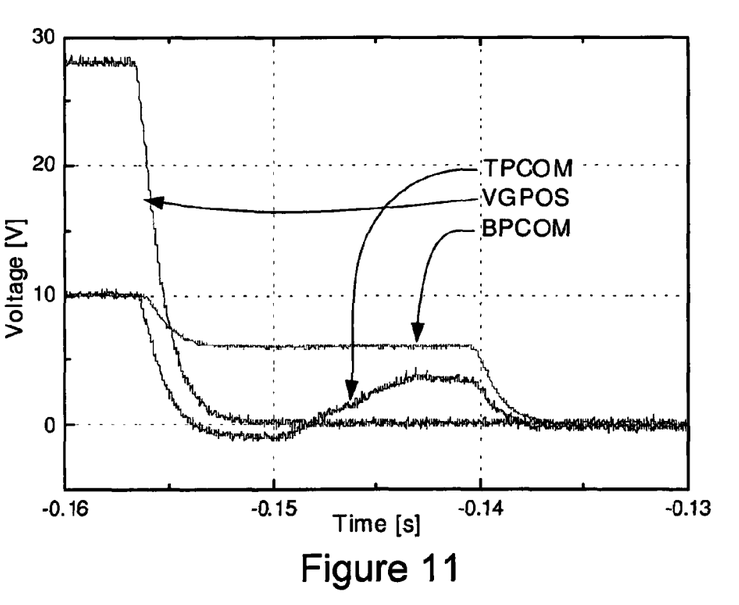
FIG. 11 shows curves of voltage against time for TPCOM, a backplane common voltage (BPCOM) and a positive gateline supply (VGPOS) illustrating partial clamping of BPCOM before display of a null frame in a further modified power-down/power-up procedure for the display/driver combination of FIG. 7.

This problem can be addressed by clamping BPCOM to a small (reduced) positive voltage before the null frame and clamping BPCOM to zero volts only after the null frame. In this way the TPCOM voltage can be kept closer to zero volts. FIG. 11 illustrates the variation of TPCOM, BPCOM, and (positive) gateline voltage VGPOS in an embodiment of this approach. In the context of the device of FIG. 7 this may be implemented by providing a BPCOM reference voltage level 1104. This strategy provides a further benefit in helping to increase the minimum TPCOM voltage during power-down, relaxing the requirements on the voltage range of the TPCOM switch 554.

A modified power-up sequence may be employed to mitigate spurious display effects caused by the modified power-down sequence, but the fast null frame display during power-up may also be used independently of the modified power-down procedure to address other problems.

During repeated null frame updates where only some pixels are updated it is desirable to employ a rapid preconditioning null frame to suppress the fade effect across a display, for example by driving multiple gatelines together as explained previously. If the TPCOM voltage at the beginning of the preconditioning null frame is higher than the gate kickback voltage the pixels corresponding to the first gatelines to be addressed will be lighter (i.e. there will be a potential fade effect) if the speed of the preconditioning null frame is too low.

Although we have described some preferred embodiments of improved power-down and power-up techniques for an electronic paper display in combination with an organic TFT backplane, there are other techniques which may be employed additionally or independently to mitigate undesired display effects. For example a different technique to address the problem of leaky pixels is to maintain the BPCOM (backplane common) voltage at zero volts, although this can lead to poor updates as parasitic transistors may be turned on.

With reference to FIG. 11, clamping BPCOM (backplane common voltage) from its initial value (10 volts in the Figure) to zero volts only after display of the null frame is also effective. Again referring to FIG. 11, the roles of the VGPOS and BPCOM lines may be exchanged.

In a still further approach which may be employed additionally or alternatively to the above described techniques, the maximum TPCOM voltage may be lowered during power-up by introducing an extra null frame between the enable of VGPOS (or BPCOM) and BPCOM (or VGPOS). That is, whether or not an intermediate reference level is employed for clamping BPCOM or a gateline supply, an additional null frame may be employed between enabling one and the other of these.

Embodiments and Variations of Some Preferred Implementations

To summarise, listed below are steps in some preferred implementations of the above described techniques. The skilled person will recognise that these may be implemented in hardware (for example dedicated circuit(s) or an ASIC) or in software, or in a combination of the two, for example as part of a controller for the active matrix backplane.

Step 1:

The power down sequence is modified by introducing a "post-conditioning" null frame after the clamping of VGPOS and VGNEG to 0V.

| Power down sequence before Step 1: | Power down sequence after Step 1: |
|---|---|
| Vbpcom set to 0 V or Vtpcom or another voltage during update | Vbpcom set to 0 V or Vtpcom or another voltage during update |
| Float TPCOM | Float TPCOM |
| Clamp Vgpos and Vbpcom | Clamp Vgpos and Vbpcom |
|  | Drive 1 null frame |
| Clamp other supplies | Clamp other supplies |

Step 2:

The speed of the pre-conditioning and post-conditioning null frames can be optimized by addressing multiple gate lines at a time. This helps to suppress display non uniformities caused by the null frame while TPCOM is floating.

The skilled person will appreciate that the potential applications of the techniques in this step are more general: It provides a strategy to update the pixel electrodes faster—with both TPCOM floating or not floating—provided that the pixels addressed in parallel along each source line need to be updated with the same data.

Step 3:

In presence of an off-set top pixel, it is preferable to address the gate lines in a combed sequence and, preferably, in the same direction as when driving of such a backplane without selecting multiple gate lines simultaneously (FIG. 10).

Step 4:

Once introduced the post-conditioning null frame, BPCOM can be clamped after the null frame rather than before. This helps to keep V(TPCOM) closer to 0V (FIG. 11).

| Power down sequence before Step 4: | Power down sequence after Step 4: |
|---|---|
| Vbpcom set to 0 V or Vtpcom or another voltage during update | Vbpcom set to 0 V or Vtpcom or another voltage during update |
| Float TPCOM | Float TPCOM |
| Clamp Vgpos and Vbpcom | Clamp Vgpos |
| Drive 1 null frame | Drive 1 null frame |
|  | Clamp BPCOM |
| Clamp other supplies | Clamp other supplies |

Step 5

Rather than being clamped only after the null frame, BPCOM can be partially clamped to a voltage closer to 0V before the null frame.

| Power down sequence before Step 5: | Power down sequence after Step 5: |
|---|---|
| Vbpcom set to 0 V or Vtpcom or another voltage during update | Vbpcom set to 0 V or Vtpcom or another voltage during update |
| Float TPCOM | Float TPCOM |
| Clamp Vgpos | Clamp Vgpos and partially clamp BPCOM to a voltage closer to 0 V |
| Drive 1 null frame | Drive 1 null frame |
| Clamp BPCOM | Clamp BPCOM |
| Clamp other supplies | Clamp other supplies |

Step 6

Another way to lower the maximum V(TPCOM) during power up is to introduce an extra null frame between the enable of VGPOS and BPCOM—when the BPCOM voltage is different from 0V during the update.

| Power up sequence before Step 6: | Power up sequence after Step 6: |
|---|---|
| Enable all voltage supplies except VGPOS (connected to gate lines), VBP_COM (connected to common electrode), and VTP_COM, with source lines kept at 0 V | Enable all voltage supplies except VGPOS (connected to gate lines) and VBP_COM (connected to common electrode), and VTP_COM, with source lines kept at 0 V |
| Open top-plane COM switch to isolate the display top VTP_COM supply. | Open top-plane COM switch to isolate the display top VTP_COM supply. |
| Enable HV supplies VGPOS, VTP_COM, VBP_COM | Enable HV supplies VGPOS, VTP_COM |
|  | Write one preconditioning null frame to the display. |
|  | Enable HV supply VBP_COM |
| Write one preconditioning null frame to the display | Write one preconditioning null frame to the display |
| Close the top-plane COM switch | Close the top-plane COM switch |
| Write image update data to the display system | Write image update data to the display system |

Step 7

In steps 4, 5 and 6 above the roles of BPCOM and VGPOS can be exchanged.

Although we have described some example embodiments with reference to a monochrome display the skilled person will appreciate that the techniques are equally applicable to a colour display where, broadly speaking, references to darker/whiter should be taken to refer to a darker/lighter colour.

We have described a pixel driver circuit with p-type transistors but n-type driver transistors may alternatively be employed. Substantially the same considerations apply although the sign of the gate voltages and relative capacitive couplings change. In particular the colour change problem we have described can occur during power-down when the TPCOM voltage goes to negative.

No doubt many other affective alternatives will occur to the skilled person. It will be understood that the invention is not limited to the described embodiments and encompasses modifications apparent to those skilled in the art lying within the spirit and scope of the claims appended hereto.

The invention claimed is:

1. A method of reducing artefacts in an image displayed by an active matrix non-volatile electro-optic display and non-volatile electro-optic display driver, the non-volatile electro-optic display driver comprising a plurality of active matrix pixel drivers each driving a respective pixel of the non-volatile electro-optic display, each active matrix pixel driver having an associated storage capacitor coupled to a common backplane connection of the non-volatile electro-optic display driver, pixels of the non-volatile electro-optic display having a common pixel electrode, the method comprising:

disconnecting said common pixel electrode from a common pixel electrode power supply such that said common pixel electrode is floating;

controlling a common backplane power supply to clamp said common backplane connection to a first defined voltage level, wherein said first defined voltage level is a zero volts level; and after said disconnecting and said controlling, driving the non-volatile electro-optic display with a null frame during a power-down procedure of the display, wherein the non-volatile electro-optic display is driven with the null frame whilst the common pixel electrode is floating and the common backplane connection is clamped to the first defined voltage level, and wherein said null frame comprises a frame of data values defining no change in a displayed colour or brightness level.

2. A method as claimed in claim 1 wherein each active matrix pixel driver comprises a driver transistor, coupled to said storage capacitor and having a control input coupled to a pixel select line, the method further comprising clamping said pixel select lines of said active matrix pixel drivers to a second defined voltage level prior to said driving with said null frame.

3. A method as claimed in claim 2 further comprising clamping one or both of said common backplane connection and a said pixel select line to a third defined voltage level, lower than at least one of said first and second voltage levels, subsequent to said clamping to said respective first or second defined voltage level; and wherein said second defined voltage level is a zero volts level.

4. A method as claimed in claim 1 wherein, after said driving with a null frame, a voltage level on said common pixel electrodes changes towards that of a background colour of said non-volatile electro-optic display.

5. A method as claimed in claim 1 wherein each active matrix pixel driver comprises a driver transistor, coupled to said storage capacitor and having a control input coupled to a pixel select line, and wherein said driving with a null frame comprises selecting a plurality of said pixel select lines simultaneously; and where alternate ones of said pixel select lines are selected simultaneously.

6. A method as claimed in claim 1 further comprising driving said non-volatile electro-optic display with a second null frame.

7. A method as claimed in claim 1 further comprising using a power-up procedure to compensate for a tendency of said non-volatile electro-optic display to change away from a background colour during repeated null frame driving; and displaying a preconditioning null frame during said power up procedure.

8. A method as recited in claim 1 wherein said active matrix pixel drivers of said non-volatile electro-optic display driver comprise organic or solution-processed thin film transistors; and wherein said non-volatile electro-optic display is an electrophoretic display.

9. An active matrix non-volatile electro-optic display driver, the non-volatile electro-optic display driver comprising a plurality of active matrix pixel drivers each driving a respective pixel of the non-volatile electro-optic display, each active matrix pixel driver having an associated storage capacitor coupled to a common backplane connection of the non-volatile electro-optic display driver, pixels of the non-volatile electro-optic display having a common pixel electrode, the non-volatile electro-optic display driver further comprising a system to disconnect said common pixel electrode from a common pixel electrode power supply such that said common pixel electrode is floating;

control a common backplane power supply to clamp said common backplane connection to a first defined voltage level, wherein said first defined voltage level is a zero volts level; and after said disconnect and said control, drive the non-volatile electro-optic display with a null frame during a power-down procedure of the display, wherein the non-volatile electro-optic display is driven with the null frame whilst the common pixel electrode is floating and the common backplane connection is clamped to the first defined voltage level, and wherein said null frame comprises a frame of data values defining no change in a displayed colour or brightness level.

10. A display driver as recited in claim 9 wherein said active matrix pixel drivers of said non-volatile electro-optic display driver comprise organic or solution-processed thin film transistors; and wherein said non-volatile electro-optic display is an electrophoretic display.

* * * * *